US007411309B2

(12) United States Patent
Hudson

(10) Patent No.: US 7,411,309 B2
(45) Date of Patent: Aug. 12, 2008

(54) CONTROL SYSTEM FOR DOUBLY FED INDUCTION GENERATOR

(75) Inventor: Raymond M. Hudson, Livermore, CA (US)

(73) Assignee: Xantrex Technology Inc., Arlington, WA (US)

( * ) Notice: Subject to any disclaimer, the term of this patent is extended or adjusted under 35 U.S.C. 154(b) by 3 days.

(21) Appl. No.: 10/554,891

(22) PCT Filed: May 3, 2004

(86) PCT No.: PCT/US2004/013561

§ 371 (c)(1),
(2), (4) Date: Oct. 3, 2006

(87) PCT Pub. No.: WO2004/098261

PCT Pub. Date: Nov. 18, 2004

(65) Prior Publication Data

US 2007/0052244 A1    Mar. 8, 2007

Related U.S. Application Data

(60) Provisional application No. 60/467,328, filed on May 2, 2003.

(51) Int. Cl.
*H02P 9/44* (2006.01)
(52) U.S. Cl. .......................... 290/44; 290/55
(58) Field of Classification Search ............... 290/43, 290/44, 54, 55; 322/19, 37
See application file for complete search history.

(56) References Cited

U.S. PATENT DOCUMENTS 4,366,387 A    12/1982    Carter, Jr. et al.
4,982,147 A    1/1991    Lauw
4,994,684 A    2/1991    Lauw et al.
5,028,804 A    7/1991    Lauw
5,239,251 A    8/1993    Lauw
5,798,631 A *  8/1998    Spee et al. .................... 322/25
6,072,302 A    6/2000    Underwood et al.
6,281,595 B1    8/2001    Sinha et al.
6,566,764 B2    5/2003    Rebsdorf et al.

(Continued)

FOREIGN PATENT DOCUMENTS

WO    WO 2004/098261 A2    11/2004

OTHER PUBLICATIONS

Hofmann, W., "Doubly-Fed Full-Controlled Induction Wind Generator for Optimal Power Utilisation," *PEDS '01 Conference Proceedings*, Chemnitz, Germany.

(Continued)

*Primary Examiner*—Nicholas Ponomarenko
(74) *Attorney, Agent, or Firm*—Christensen O'Connor Johnson Kindness PLLC

(57) ABSTRACT

A controller (28) for a doubly fed induction generator (12,20) adjusts control signals to a rotor side converter (24) and line side converter (22) to adjust rotor current when a voltage transient on a utility grid (10) occurs, so that the doubly fed induction generator can ride through the transient. The controller can also turn off the transistors of the rotor side converter (24) to reduce rotor current and/or activate a crowbar (42) to reduce the voltage of the DC link (26) connecting the converters (22, 24) when significant voltage transients occur on the grid (10). This permits continued operation of the DFIG system without disconnecting from the grid.

25 Claims, 10 Drawing Sheets

U.S. PATENT DOCUMENTS

| | | | |
|---|---|---|---|
| 6,700,214 | B2 | 3/2004 | Ulinski et al. |
| 6,741,059 | B2 * | 5/2004 | Gokhale et al. ............. 318/700 |
| 6,784,634 | B2 | 8/2004 | Sweo |
| 6,847,128 | B2 | 1/2005 | Mikhail et al. |
| 6,856,038 | B2 | 2/2005 | Rebsdorf et al. |
| 6,856,039 | B2 | 2/2005 | Mikhail et al. |
| 6,856,040 | B2 | 2/2005 | Feddersen et al. |
| 6,933,625 | B2 * | 8/2005 | Feddersen et al. ............. 290/44 |
| 7,095,131 | B2 * | 8/2006 | Mikhail et al. ................ 290/44 |
| 7,239,036 | B2 * | 7/2007 | D'Atre et al. ................. 290/44 |
| 7,291,937 | B2 * | 11/2007 | Willisch et al. ............... 290/44 |
| 7,321,221 | B2 * | 1/2008 | Bucker et al. ................. 322/44 |
| 2002/0014773 | A1 | 2/2002 | Stricker |
| 2007/0132248 | A1 * | 6/2007 | Weng et al. .................... 290/44 |
| 2007/0182383 | A1 * | 8/2007 | Park et al. ..................... 322/89 |
| 2007/0278797 | A1 * | 12/2007 | Flannery et al. ............... 290/44 |
| 2008/0001408 | A1 * | 1/2008 | Liu et al. ...................... 290/44 |

OTHER PUBLICATIONS

Pena, R., et al., "Doubly Fed Induction Generator Using Back-to-Back PWM Converters and its Application to Variable-Speed Wind-Energy Generation," *IEE Proc.-Electr. Power Appl.* 143(3):231-241, May 1996.

Poitiers, F., et al., "Control of a Doubly-Fed Induction Generator for Wind Energy Conversion Systems," *International Journal of Renewable Energy Engineering* vol. 3, No. 2, Aug. 2001.

Rostoen, H.O., et al., "Doubly Fed Induction Generator in a Wind Turbine," Norwegian University of Science and Technology, 2002 <http://www.elkraft.ntnv.no/eno/Papers2002/Rostoen.pdf>.

* cited by examiner

CONTROL SYSTEM FOR DOUBLY FED INDUCTION GENERATOR

CROSS-REFERENCE TO RELATED APPLICATION

This application claims the benefit of U.S. provisional Application No. 60/467,328, filed on May 2, 2003.

FIELD OF THE INVENTION

The present invention relates to power electronics converters used in variable speed machine control, particularly those used in wind turbines. More specifically, the present invention relates to a control system having power electronics converters for doubly fed induction generators to allow a variable speed turbine to continue to operate in the presence of voltage transients that occur on a utility grid.

BACKGROUND OF THE INVENTION

Large scale (Megawatt class) wind turbines are becoming increasingly used as a source of renewable energy for utilities throughout the world. One approach to achieving efficient conversion of the mechanical power from the blades of a wind turbine into electrical energy supplied to a utility grid is the use of a doubly fed induction generator (DFIG) combined with a power electronics converter. The operation of such systems has been described in a number of publications, of which the following are representative:

Pena et al., "Doubly Fed Induction Generator Using Back-to-Back PWM Converters and Its Application to Variable Speed Wind-Energy Generation," IEEE Proc.-Electr. Power Appl. 143(3):231-241, May 1996.

Rostoen et al., "Doubly Fed Induction Generator in a Wind Turbine," Norwegian University of Science and Technology, 2002 (www.elkraft.ntnu.noleno/Papers2002/Rostoen.pdf).

Poitiers et al., "Control of a Doubly-Fed Induction Generator for Wind Energy Conversion Systems," *International Journal of Renewable Energy Engineering* Vol. 3, No. 2, August 2001.

U.S. Pat. No. 4,994,684, Lauw et al., "Doubly Fed Generator Variable Speed Generation Control System," Feb. 19, 1991.

The primary components of a representative DFIG system are a stator connected to the utility grid, an associated rotor connected to the wind turbine, rotor electrical connections through slip rings, a rotor side converter, a line side converter, a DC link connecting the two converters, and a controller for the converters.

The doubly fed induction generator system is generally quite well suited to variable speed wind turbine operation, but grid voltage variations can present a problem. For example, transient conditions on the utility grid may occur for short periods of time, such as a few cycles, or for longer periods of time. A common example is a sag or surge in the grid voltage. Previous systems have contemplated reacting to these instabilities by activating a command to drop the DFIG system off the line, i.e., to disconnect the generator from the utility grid. Thereafter, when the quality of the utility voltage is reinstated, the generator is restarted and output power is conditioned as necessary prior to reconnection to the grid.

SUMMARY OF THE INVENTION

The present invention provides a control system that allows a doubly fed induction generator to "ride through" many voltage transients on the utility grid, so that the generator need not be disconnected and subsequently restarted. This is accomplished by sensing the grid transients and, when predetermined significant variations are detected, automatically adjusting the flux-producing rotor current corresponding to the altered line voltage. The adjustment is made dynamically by command signals from the controller to the rotor side converter to regulate rotor current. In an embodiment of the invention, both the flux producing ($I_{rd}$) and torque producing ($I_{rq}$) components of the rotor current are adjusted when a significant utility voltage variant is detected. If the adjustment is not sufficient to restore a desired balance, such as if the transient is too great or continues for too long a period, the transistors in the rotor side converter are turned off, having the effect of reducing the rotor current to the minimum level. If turning off the rotor side converter transistors is not sufficient to maintain a desired balance (as detected by monitoring the DC link voltage), an overvoltage crowbar protection circuit is actuated to rapidly reduce the DC link voltage until an acceptable level is obtained and control is returned. In many instances, controlling the current in the rotor by means of the rotor side converter and/or the activation of the crowbar is sufficient to allow the turbine to ride through the transient, and the system is automatically returned to normal operation when the utility voltage returns to normal or close to normal operating conditions.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

General Operation

Figure 1:
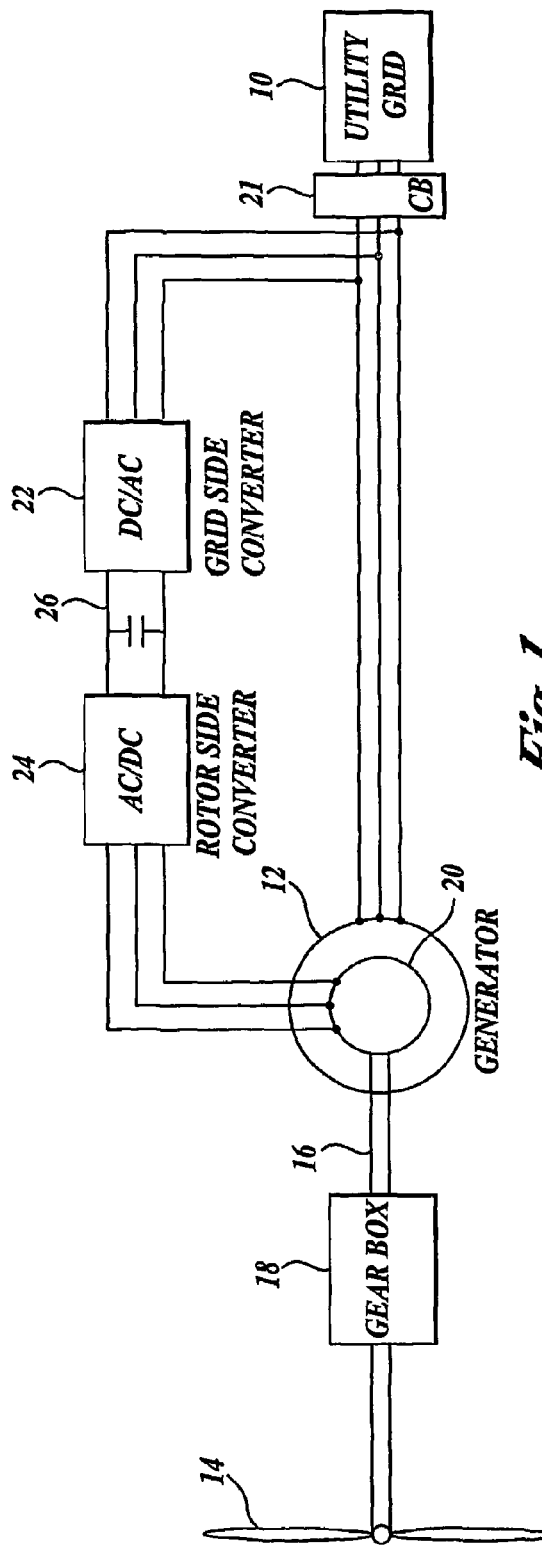
FIG. 1 is a simplified diagram of a doubly fed induction generator (DFIG) system.

A simplified diagram of a doubly fed induction generator system is shown in FIG. 1. A utility grid 10 energizes the windings of the generator stator 12 (represented as the outer circle). Typically the grid supplies three phase alternating current. Supplied line voltage can be designated as VLine or $V_L$ and supplied line current designated as ILine or $I_L$. The three phase parameters can be designated as: $V_{Lab}, V_{Lbc}, V_{Lca}$ for phase to phase voltages; $I_{La}, I_{Lb}, I_{Lc}$ for phase currents. The stator voltage can be designated $V_s$, stator current $I_s$, and three phase parameters: $V_{sab}, V_{sbc}, V_{sca}$ for phase to phase voltages; $I_{sa}, I_{sb}, I_{sc}$ for phase currents.

At the rotor side, the wind-driven blade assembly 14 drives the rotor shaft 16, such as through a gear box 18. This generates the mechanical force to turn the DFIG rotor 20 (represented as the inner circle). The rotor electrical connections are through slip rings. Rotor voltage can be represented as $V_r$, and rotor current as $I_r$; with the three phase parameters designated as: $V_{rab}, V_{rbc}, V_{rca}; I_{ra}, I_{rb}, I_{rc}$.

In addition to exciting the stator windings, the three phase power from the utility grid is connected to an AC/DC grid side converter 22. A circuit breaker 21 can be provided between the grid and the connections to the stator 12 and grid or line side converter 22. At the other side of the drawing, alternating current from the rotor windings is supplied to an AC/DC rotor side converter 24. The two power converters 22 and 24 are connected by a DC bus 26.

To allow for efficient operation of the wind turbine, the rotor shaft rotates at a varying frequency. In conventional systems, the rotor side converter includes switching transistors that, under normal operating conditions, adjust the rotor current, and thereby generator torque, through the variable frequency range. The reactive power at the generator terminals may also be controlled by the rotor current. Serious instabilities in the utility power may be dealt with by activation of the circuit breaker 21 to disconnect the DFIG from the grid. This requires a restart procedure before the DFIG is reconnected.

Figure 2A:
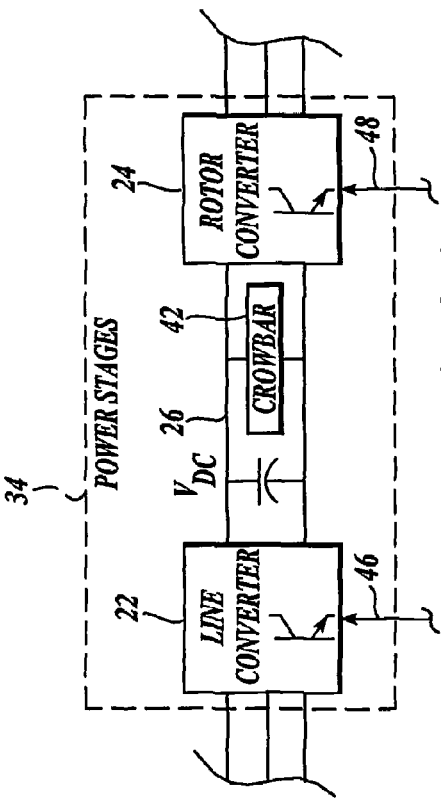
FIG. 2 is a more detailed, but still general diagram of a DFIG system in accordance with the present invention, and FIG. 2A (on the drawing sheet with FIG. 1) is an enlarged detail diagram showing one aspect of a modified DFIG system in accordance with the present invention.
Figure 2:
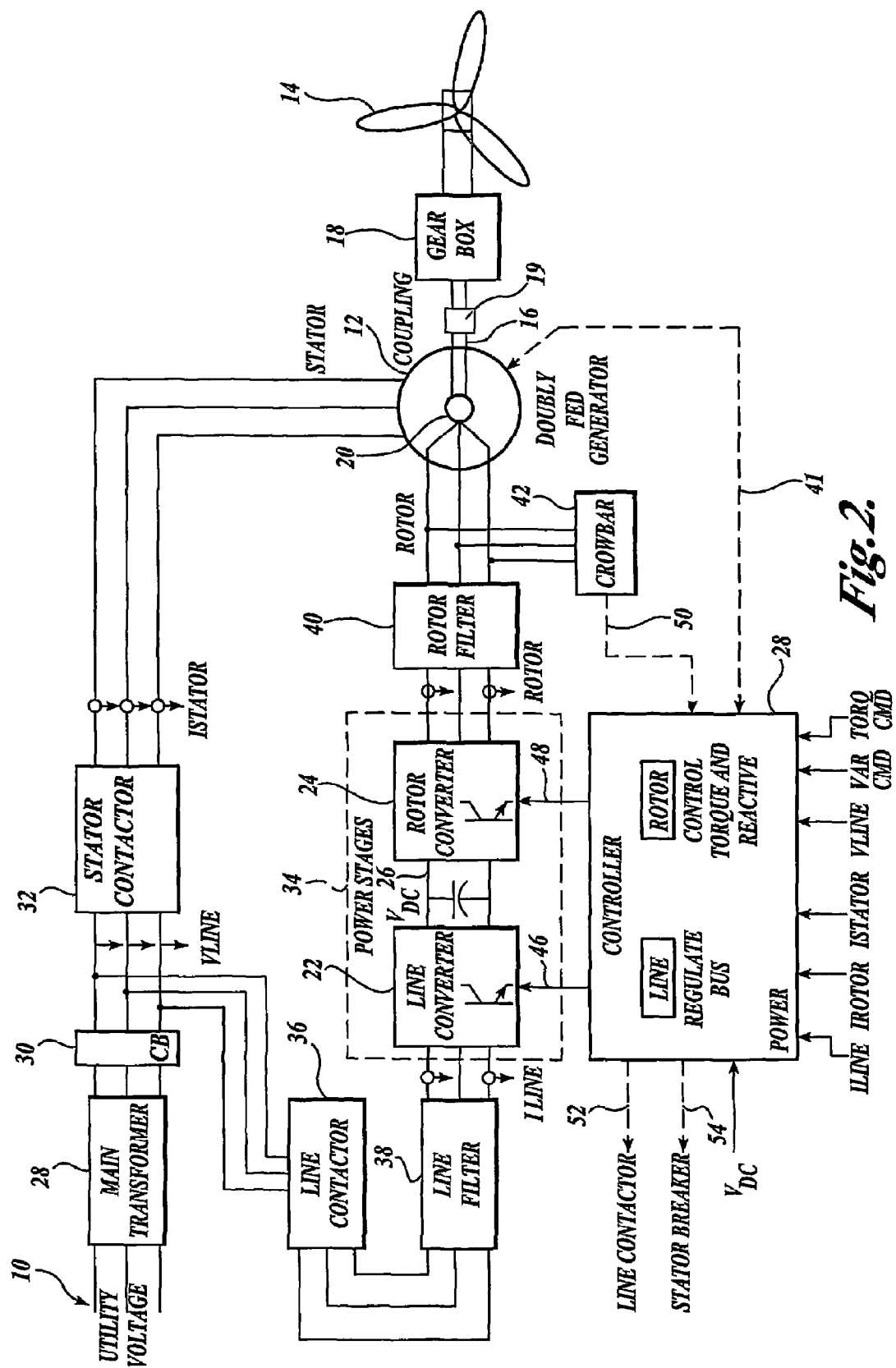

FIG. 2 shows a more detailed, but still general, diagram of a doubly fed induction generator (DFIG) system in accordance with the present invention. Referring to the upper left of FIG. 2, the utility voltage from the grid 10 is supplied to the system through a transformer 28 and, a circuit breaker 30. The voltage and current components of the power are supplied directly to the stator through a conventional contactor 32.

Utility power is supplied to the power stages 34 (consisting of grid or line side converter 22 and rotor converter 24) through a conventional line contactor 36 and line filter 38. The line and rotor converters 22 and 24 are connected by a common DC bus 26.

The wind-driven blade assembly 14 drives the rotor shaft 16, such as through a gearbox 18 and a coupling 19. The rotor converter is connected with the generator rotor electrical circuit by a slip ring assembly. By using a wound rotor generator, the rotor converter does not have to process the fall power of the system, which reduces the size and thereby cost of the converter and improves the system efficiency. A tachometer encoder, represented by broken line 41, is used to measure the position and frequency of the DFIG rotor.

In the illustrated embodiment each of the converters 22 and 24 uses insulated gate bipolar transistors (IGBT's), but other switching devices can be used in other implementations, such as SCR's or MOSFET's. In the illustrated embodiment, three phase power is provided. In each converter six transistors (two each for phases A, B, C) are controlled by on/off gating signals (A+, A−; B+, B−; and C+, C−). Current through the rotor windings passes through a rotor filter 40. A crowbar 42 utilizes switching devices that connect the three phase rotor power conductors together through an impedance which may be an inductance and/or resistance. The crowbar can be connected at the location shown in FIG. 2 but alternatively can be connected across the DC link 26 as represented in FIG. 2A (on the drawing sheet with FIG. 1).

A controller 28 monitors signals of many of the system variables and controls operation of the line and rotor converters 22 and 24, and the crowbar circuit 42. As represented in FIG. 2, these variables include:
  voltage on the DC bus 26 ($V_{DC}$);
  the utility line current for each of the three phases (ILine, that is, $I_{La}, I_{Lb}, I_{Lc}$);
  utility line voltage (VLine, that is, $V_{Lab}, V_{Lbc}, V_{Lca}$);
  stator current (IStator: $I_{sa}, I_{sb}, I_{sc}$);
  rotor currents (IRotor: $I_{ra}, I_{rb}, I_{rc}$);
  tachometer encoder signal (from which can be derived speed, direction, and position of the rotor-represented by line 41);
  reference values for desired reactive power (VAR CMD) and torque (TORQ_CMD) as determined conventionally (typically from an overall wind turbine controller).

Based on the monitored variables, the controller 28 implements the line and rotor control algorithms to control operation of the converters 22 and 24 by supplying the IGBT switching signals by a current regulator (such signals are represented by line 46 for the stator converter 22 and line 48 for the rotor converter 24). The controller also generates control signals for operation of the crowbar circuit 42 (as represented by line 50), line contactor 36 (as represented by line 52), and the stator contactor 32 (as represented by line 54).

Two of the most important aspects of megawatt class wind turbines employing doubly fed induction generators are the ability to accurately control the torque on the rotor and to provide high power quality to the utility grid. Both features are implemented by the command/switching signals to the rotor and line side converters. At rotor speeds below the synchronous speed of the generator, power flows into the DC link and into the rotor. Above synchronous speed, the power flow is out of the rotor and out of the DC link to the utility grid. In known systems, rotor current is set to achieve the desired level of rotor torque (TORQ CMD) and reactive power (VAR CMD) to or from the grid.

The rotor current control signals in the controller algorithms can be designated IRD_CMD (command signal for flux-producing component of rotor current) and IRQ_CMD (command signal for torque-producing component of rotor current). In one aspect of the present invention, it is these command signals that are adjusted to permit ride through during utility voltage transients. A ride through algorithm is performed to step up or ramp down the IRD and IRQ command signals and thereby control the rotor current based on the transient on the grid. For example, in one implementation of the present invention a comparator determines whether or not the actual utility line voltage has fallen below a predetermined value, such as 70% of nominal. If so, a "sag_protect" or "sag_ramp" value is used to adjust the IRD and IRQ command signals. Thus, if the utility line voltage is between 70% and 100% of nominal, no adjustment is made, whereas an adjustment begins as soon as a value of less than 70% of nominal is detected.

The IRD_CMD and IRQ_CMD ride through adjustments result in a corresponding adjustment of the rotor current, and occur only during the transient. If the size of the transient is too great, or the period too long, the adjustment may not be sufficient to bring the system into balance, and the DC link voltage will climb. In accordance with the present invention, if the DC link voltage reaches a predetermined amount above nominal, such as 10%, the transistors in the rotor converter are turned off to minimize rotor current, and if the DC link voltage rises significantly more, such as to 20% above nominal, the crowbar circuit is actuated. When the DC link voltage returns to very close to nominal, the rotor control converter is reenabled and the crowbar circuit is turned off, and the system returns to normal operation.

The line converter current magnitude is adjusted to cause the proper amount of power to flow into or out of the DC link between the line side and rotor side converters, to keep the voltage level of the DC link regulated within predetermined limits.

System Implementation for 1.5 Megawatt Wind Turbine Grid

Figure 3:
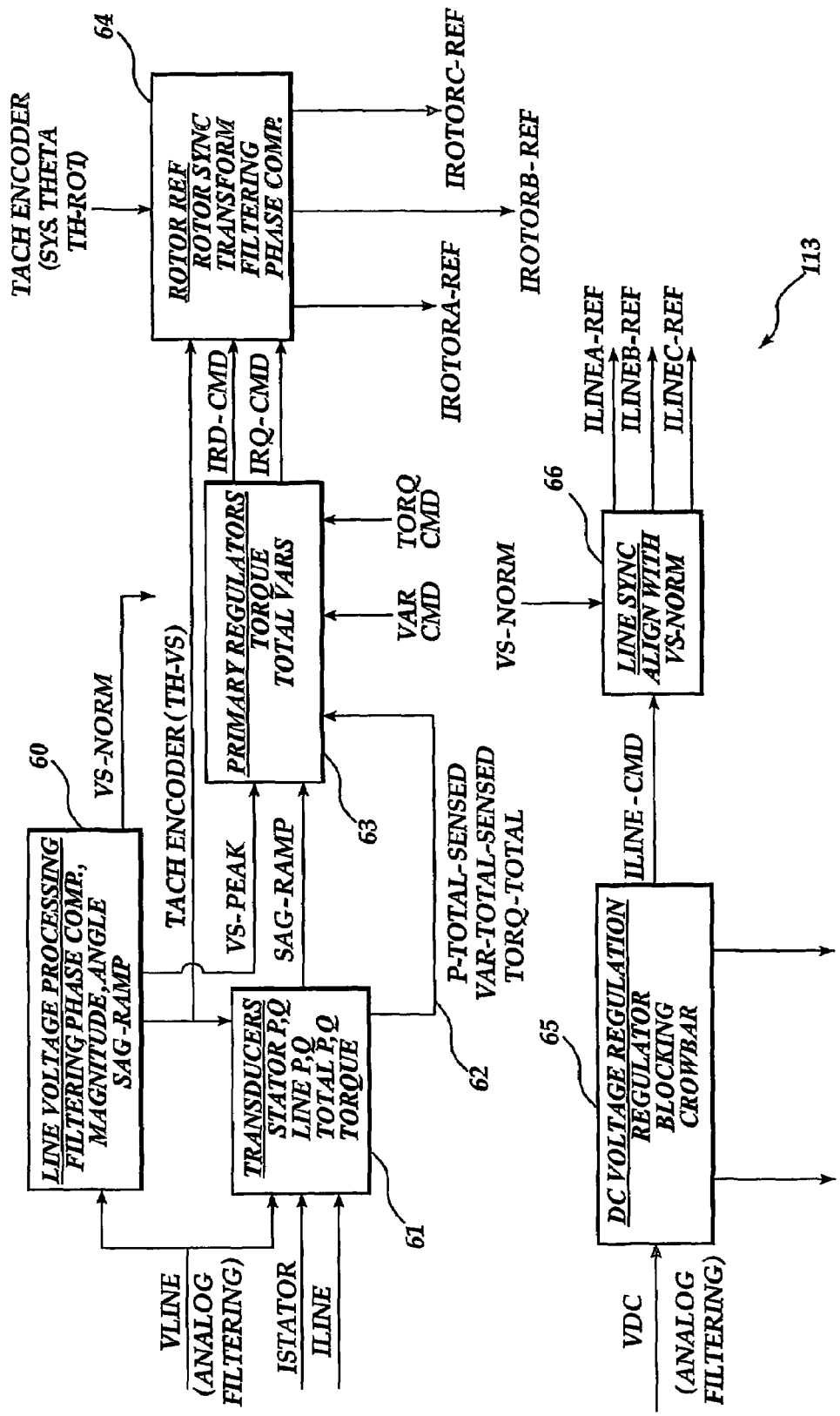
FIG. 3 is a block diagram of the control system for the DFIG of FIG. 2.

FIGS. 3 to 13 and the following discussion describe an implementation of the present invention for a 1.5 Megawatt wind turbine employing a DFIG system, with 575 VLINE connection. This implementation was designed to respond to disturbances on the utility grid to which the DFIG system is connected. Such disturbances include both balanced and unbalanced faults, where the grid voltage will be significantly distorted during the transient. To achieve these objectives, the implementation features dynamic response from faster than the millisecond time frame to several seconds. FIG. 3 illustrates an overview of the control functions with inputs the VLine, IStator, ILine, $V_{DC}$, the tachometer encoder signal, VAR_CMD and TORQ_CMD. As described below, FIGS. 4 to 13 provide additional detail. Of particular interest in the present invention are the sag_ramp adjustments which result in altering the flux and torque producing rotor current command signals (IRD_CMD and IRQ_CMD), as well as the command signals which, if necessary, turn off the switches of the rotor side converter ("switchblocking" or "BLKR_CMD") and activate the crowbar (CB_CMD).

Referring to box 60 of FIG. 3, for AC line (grid) input processing, a single first-order low-pass filter is used ahead of the A/D converter on all phases of line voltage. There is no significant analog filtering on the AC current feedbacks. Line voltage processing by the controller software consists of the following steps:

1. convert Vab,Vbc,Vca to d,q on stationary reference frame (this d,q is ac, with q leading d);
2. low-pass filter (2nd order) the d,q voltages to df,qf filtered signals;
3. determine magnitude of the alpha, beta components—magnitude in volts peak line-to-neutral—and phase compensate to get alpha, beta components, so that these line up with actual ac voltages ahead of analog filtering;
4. calculate AC voltage magnitude; and
5. compute normalized ac voltages that are in phase with actual ac voltage and have unity crest magnitude.

These processing steps are defined via the algorithms of Table 1.

TABLE 1

1. Transformation from stator stationary 3 phase frame to 2 phase frame:
sys.vd = sys.vs_ab − 0.5 * (sys.vs_bc + sys.vs_ca); (V)
sys.vq = sqrt(3) * 0.5 * (sys.vs_bc − sys.vs_ca); (V)
NOTE: sys.vd is in phase with line-to-line voltage vs_ab, and sys.vq is 90 degrees leading sys.vd. Both sys.vd and sys.vq are of 1.5 times the amplitude of line-to-line voltage.
2.  2nd order digital LP filter (update rate = 4800 Hz):
B0 = 0.0081512319/0.9;   B1 = 0.016302464/0.9;
A1 = 1.6388633;   A2 = −0.67146823;
sys.vdf = B0 * (sys.vd + sys.vdnm1) + B1 * sys.vdn + A1 * sys.vdfn + A2 * sys.vdfnml;
sys.vqf = B0 * (sys.vq + sys.vqnm1) + B1 * sys.vqn + A1 * sys.vqfn + A2 * sys.vqfnml;
B0 = 0.0081512319/0.9; B1 = 0.016302464/0.9;
A1 = 1.6388633; A2 = −0.67146823;
sys.vdnm1 = sys.vdn; sys.vdn = sys.vd;
sys.vdfm1 = sys.vdfn; sys.vdfn = sys.vdf;
sys.vqnm1 = sys.vqn; sys.vqn = sys.vq;
sys.vqfm1 = sys.vqfn; sys.vqfn = sys.vqf;
3.  alpha, beta magnitude and phase compensation (−23 degrees):
v_alpha = sys.vdf * cos(sys.theta_comp) + sys.vqf * sin(sys.theta_comp);
v_beta = sys.vdf * sin(sys.theta_comp) + sys.vqf * cos(sys.theta_comp);
sys.theta_comp = −(23/180 * π);
NOTE: in this implementation the (−23 degrees) compensates angle changes introduced by hardware filter and the digital filter as well as the transformation from line-line into line-neutral; v_alpha has been rotated to be in phase with the line-to-neutral voltage van, v-beta is 90 degrees leading v_alpha (their amplitudes are kept to 1.5 times the line-to-line voltage).
4.  AC voltage magnitude:
sys.v_peak = 2.0/3.0 * sqrt(v_alpha * v_alpha + v_beta * v_beta);
NOTE: sys.v_peak is the amplitude of the line-to-line voltage; this is shown as VS-PEAK in FIG. 3.
5.  normalized voltages:
sys.line_norm_a = (2.0/3.0) * v_alpha/sys.v_peak;
sys.line_norm_c = ((−1.0/3.0) * v_alpha − (sqrt(3)/3) * v_beta)/sys.v_peak;
sys.line_norm_b = − [sys.line_norm_a] − [sys.line_norm_c]
NOTE: sys.line_norm_a is in phase with phase line to neutral voltage Van; sys.line_norm_c is in phase with phase voltage Vcn; sys.line_norm_b is in phase with phase voltage Vbn; all have unity amplitude; this is shown as VS-NORM in FIG. 3.

As represented by box 61 of FIG. 3, the AC line voltage (VLINE), the measured stator current (ISTATOR) and the measured line current (ILINE) are used to calculate real and reactive power. In the DFIG system implementation, line currents and stator currents are transformed to a stationary D,Q reference frame using the angle from the line voltage processing. These are used with the line voltage sensed prior to digital filtering to compute real and reactive power. Transformations of stator and line inverter currents and voltages from stationary three phase frame into two phase frame are given in Table 2.

TABLE 2 is_alpha = (3.0/2.0) * sys.is_a;
is_beta = sqrt(3)/2 * (sys.is_b − sys.is_c);
line_i_alpha = (3.0/2.0) * sys.line_ia;
line_i_beta = sqrt(3)/2 * (sys.line_ib − sys.line_ic);
vs_x = sys.vs_ab + (1.0/2.0) * sys.vs_bc;
vs_y = sqrt(3)/2.0 * sys.vs_bc;
vmag = sqrt(vs_x * vs_x + vs_y * vs_y);
psi = atan(vs_y, vs_x);
here all the sensed values used are prior to digital filter; and vs_x is in phase
 with phase voltage van, and vs_y is 90 degrees leading vs_x, the
 magnitude of all vs_x, vs_y and vmag are of 1.5 times of phase voltage;
 note that i_alpha and i_beta are of 1.5 times the magnitude of the phase current;
isd = cos(psi + sys.vs_filter) * is_alpha + sin(psi + sys.vs_filter) * is_beta;
isq = −sin(psi + sys.vs_filter) * is_alpha + cos(psi + sys.vs_filter) * is_beta;
where sys.vs_filter is the phase compensation for the voltage sense analog filter;
s_kw = isd * vmag * (2.0/3.0) * 0.001;
s_kvar = −1.0 * isq * vmag * (2.0/3.0) * 0.001;
where isd is the real power current component and isq is the reactive power
 current component in the frame rotating with the magnetic field; and
 s_kw is the stator real power in kW, and s_kvar is the stator reactive
 power in kVar.

Referring to line 62 of FIG. 3 from box 61, total sensed power (P−TOTAL−SENSED); and total sensed reactive power (VAR−TOTAL−SENSED) are calculated conventionally from the sum of the line and stator current, which is the total current, and the measured line voltage.

In accordance with the present invention, for closed torque control, the feedback is calculated from the sensed instantaneous stator real power rather than from the rms current and voltage values. Torque is estimated from measured stator power, assuming line frequency is nominal (i.e., 60 Hz). See Table 3.

TABLE 3 sys.torq_sensed (referred to as TORQ − TOTAL in FIG. 3) =
1000.0 * s_kw * (POLE_PAIRS/(2.0 * pi * LINE_FREQUENCY)); where
POLE_PAIRS = 3.0 (for a six pole generator), LINE_FREQUENCY = 60.0 for US and 50.0 for EUROPE; units of torque sensed are in Newton-meters, and units for s_kw are stator kilowatts.

Figure 4:
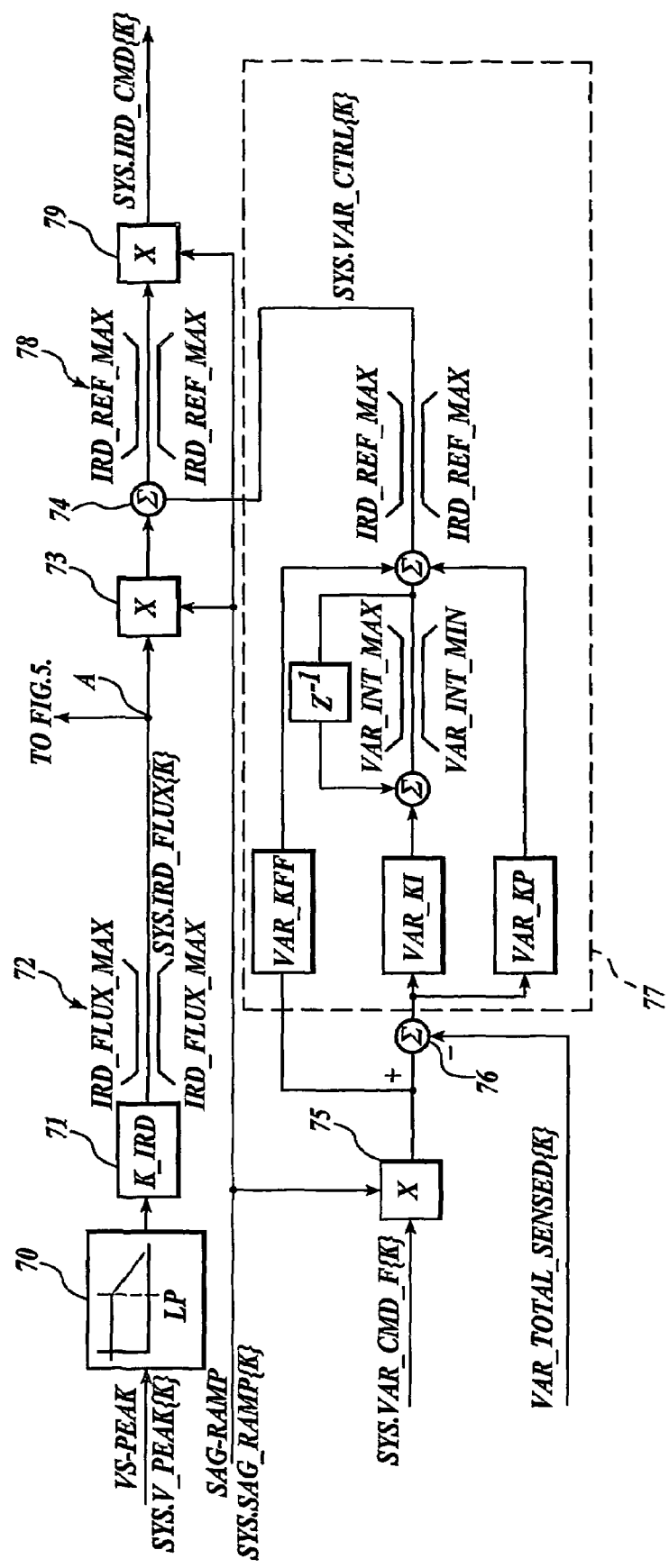
FIG. 4 is a diagram of a first aspect of the control system.
Figures 5, 6:
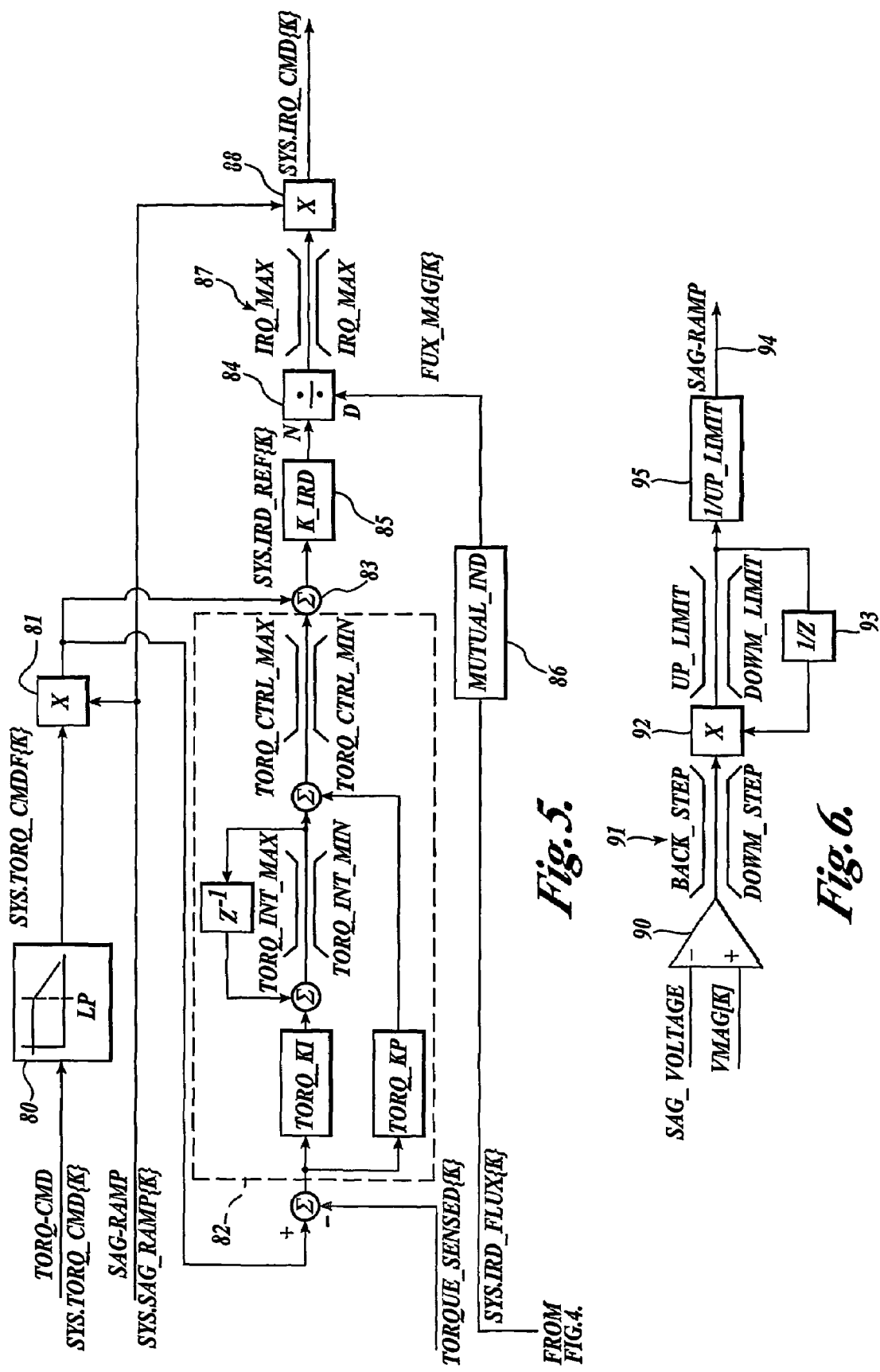
FIG. 5 is a diagram of a second aspect of the control system.
FIG. 6 is a diagram of a third aspect of the control system.

With reference to box 63 of FIG. 3, FIGS. 4 and 5 illustrate the algorithms for the primary rotor regulators, FIG. 4 applying to the VAR control by control of the flux producing component of rotor current (IRD_CMD), and FIG. 5 applying to torque control by IRQ_CMD. In these figures, "VS-PEAK" or "sys.v_peak" is the amplitude of the sensed line-to-line voltage (volts), "sys.ird_flux" is in amperes, and "flux_mag" is in volt-sec or Weber. Table 4 applies to FIG. 4 and Table 5 applies to FIG. 5.

TABLE 4

K_IRD = 0.4919, IRD_FLUX_MAX = 500(A), IRD_FLUX_MIN = 275(A),
 IRD_REF_MAX = 920 A,

TABLE 4-continued

IRD_REF_MIN = −350 A, VAR_KFF = 0.01 * 0.0,
Var_ki = 0.00001 *
 100.0, Var_kp = 0.001 * 200.0,
VAR_INT_MAX = 725 A, VAR_INT_MIN = −325 A, VAR_CTRL = 920A,

TABLE 4-continued

VAR_CTRL_MIN = −350 A,
Sys.var_cmd_f in (kvar), var_total_sensed in (kvar)
0.1 Hz LP filter:
sys.v_peak_f[k]= Y_TENTH_HZ * sys.v_peak_f[k−1] + (1.0 − Y_TENTH_HZ) * sys.v_peak[k];
Y_TENTH_HZ = 0.999869108, Sampling frequency = 4800 Hz.

TABLE 5 sys.torq_cmd_f[k] = Y_200 Hz * sys.torq_cmd_f[k−1] + (1.0 − Y_200 HZ) * sys.torq_cmd[k];
Y_200 HZ = 0.769665412, Sampling frequency = 4800 Hz
TORQ_ki = 0.00001 * 100.0, TORQ_kp = 0.001 * 150.0,
 Torq_INT_MAX = 1000(N−M),
Torq_INT_MIN = −1000(N−M), Torq_CTRL_MAX = 1000(N−M),
Torq_CTRL_MIN = −1000(N−M),
K_IRQ = 0.152327, IRQ_MAX = 1500(A), IRQ_MIN = −1500(A),
MUTUAL_IND = MAIN_IND * RATIO = 0.00456872(H)
Sys.torq_cmd in (N−M), torque_sensed in (N−M), sys.ird_flux in (A)

The general flow of FIG. 4 is as follows: VS−PEAK is passed through a digital low pass filter (box 70) and multiplied by a constant (box 71). The product is limited between predetermined maximum and minimum values at 72 and this value, sys.ird_flux, is multiplied (box 73) by the adjusting SAG−RAMP value as determined below. The adjusted value is summed (74) with the value determined from the algorithm represented toward the bottom of FIG. 4. The desired reactive power VAR CMD adjusted by the SAG−RAMP value (box 75) is compared to the actual sensed reactive power (summation block 76) and the difference applied to a proportional and integral controller with feed forward 77. The value from this processing is summed at 74, and then limited between predetermined values at 78 and multiplied by the SAG-RAMP adjustment (79).

The process for calculating IRQ_CMD (command signal for torque producing component of rotor current—sys.ird_cmd) is represented in FIG. 5 and TABLE 5. The TORQ_CMD signal is applied to a digital filter 80 and multiplied by the SAG-RAMP value (box 81). As represented toward the bottom of FIG. 5, calculated actual torque is applied to a proportional and integral controller 82 and summed (83) with the adjusted TORQ_CMD value discussed above. At box 84 a quotient is determined using the value from the proportional and integral controller (multiplied by a constant based on generator parameters—box 85) as the numerator and the value from point A of FIG. 4 multiplied by a constant (box 86). The quotient (from 84) is limited at 87 and multiplied at 88 by the SAG-RAM adjustment value to obtain the IRQ_CMD value.

FIG. 6 is of particular interest in the illustrated embodiment because it pertains to the gain function ("sag_ramp" or "sag_gain") which is created and applied to the IRD_CMD and IRQ_CMD signals during undervoltage transient events. This gain is used in the primary regulators to reduce current commands during the utility grid transient. Table 6 sets forth the parameters for FIG. 6.

TABLE 6

SAG_VOLTAGE = 0.7 *PEAK NORMAL_LINE-to_LINE_VOLTAGE = 0.70 * 575 * sqrt(2)
BACK_STEP = 1.00145
DOWN_STEP = 0.9
DOWN_LIMIT = 0.001
UP_LIMIT = 1.1

The general operation is to determine whether or not the magnitude of the AC line (grid) voltage (represented by VMAG) has dipped below a reference voltage ("SAG_VOLTAGE"). If so, the adjustment multiplier (SAG-RAMP) is decreased and continues to decrease to a minimum limit as long as the variation exists. If the variation is brought back into balance, the SAG-RAMP value ramps back to unity so that no adjustment is made.

More specifically, as represented at 90, the reference voltage (70% of nominal in a representative embodiment) is compared to the actual AC line voltage (vmag—see Table 2). The difference is limited as indicated at 91. At 92, this value is multiplied by a number between upper and lower limits at a digital cycle frequency represented at 93 which can be 4800 Hz. The values are selected such that if the actual line voltage remains within the selected percentage of nominal, the result at 94 (following the division at 95) is unity ("1"), such that no adjustment is made. The described implementation reduces both the flux producing and torque producing components of rotor current equally. In alternative embodiments, the adjustment for one of the components could be different to meet requirements of the utility grid. For example, during ride through it may be desirable for the flux producing component of rotor current to be increased to provide reactive power to the utility grid.

Figures 7, 8:
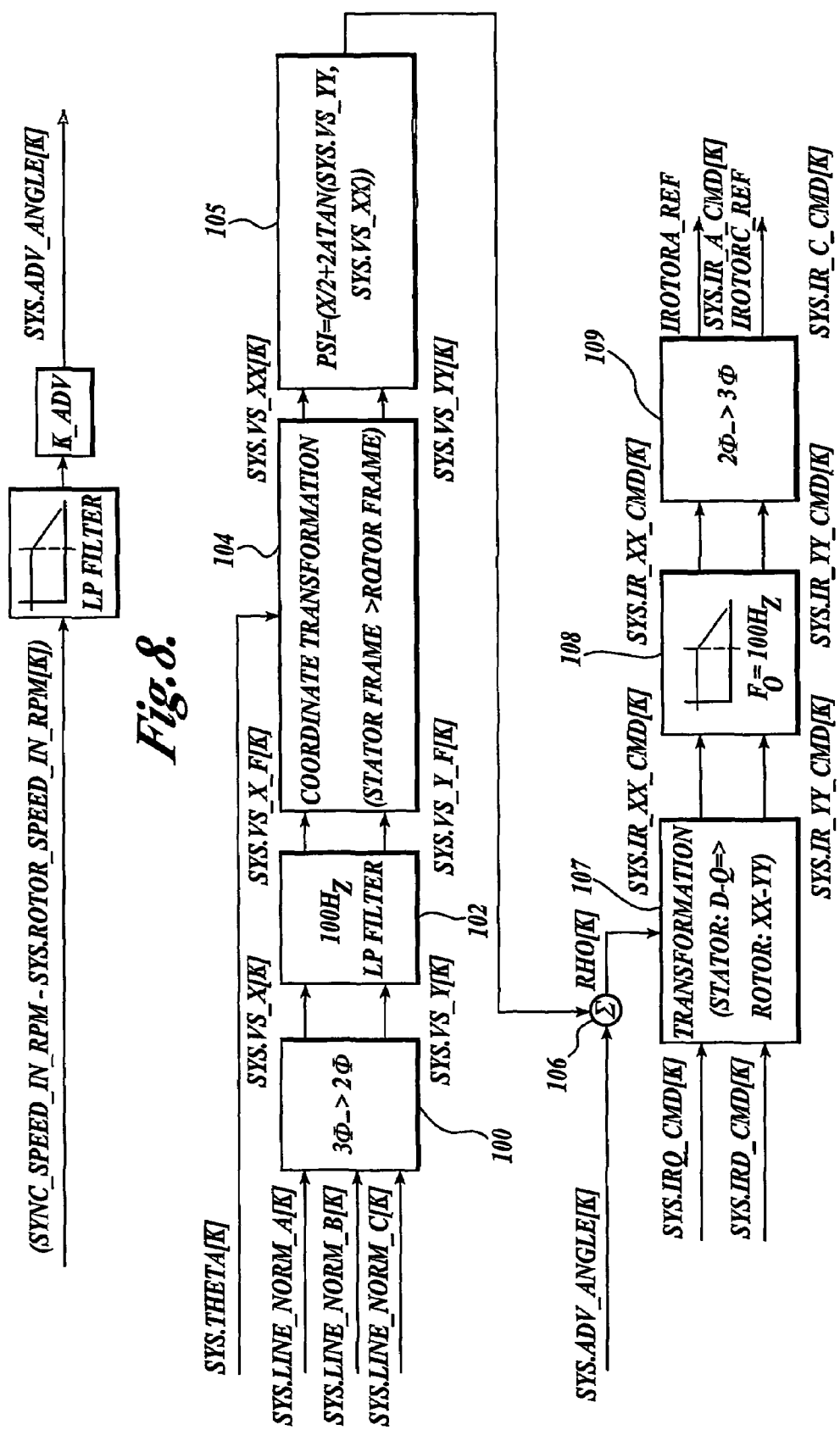
FIG. 7 is a diagram of a fourth aspect of the control system.
FIG. 8 is a diagram of a fifth aspect of the control system.

With reference to box 63 of FIG. 3, rotor current reference values are determined as shown in FIG. 7 to which Table 7 applies.

TABLE 7

Y_1000 HZ = 0.270090838, Sampling frequency = 4800 Hz
(1) sys.vs_x = -1.5 * sys.line_norm_a;
(2) sys.vs_y = sqrt(3) * (0.5 * sys.line_a + sys.line_norm_c);
(3) sys.vs_xx = sys.vs_x_f * cos(sys.theta) + sys.vs_y_f * sin(sys.theta);
(4) sys.vs_yy = -sys.vs_x_f * sin(sys.theta) + sys.vs_y_f * cos(sys.theta);
(5) sys.ir_xx_cmd = cos(rho) * sys.ird_cmd - sin(rho) * sys.irq_cmd;
(6) sys.ir_yy_cmd = sin(rho) * sys.ird_cmd + cos(rho) * sys.irq_cmd;
(7) sys.ir_a_cmd = -(2.0/3.0) * sys.ir_xx_cmd_f;
(8) sys.ir_c_cmd = (1.0/3.0) * sys.ir_xx_cmd_f + (sqrt(3)/3.0) * sys.ir_yy_cmd_f;

Starting at the upper left of FIG. 7, SYS.THETA is the rotor position calculation from the tachometer encoder. The SYS.LINE_NORM values are from step 5 of Table 1 above. Three-phase to two-phase conversion (box 100) corresponds to lines (1) and (2) of Table 7. The results (sys.vx_x, for example) are passed through a low-pass filter 102. Coordinate transformation (104) is given in lines (3) and (4) of Table 7; with the result being acted on in accordance with the equation of box 105. The result provides one input to a summer at 106. The other input to the summer (SYS.ADV_ANGLE) is determined in accordance with FIG. 8 and Table 8, providing a digital value that corresponds to the difference between the actual rotor frequency and the synchronous speed multiplied by a constant (K_ADV) to compensate for the response of the rotor current regulator.

TABLE 8

SYNC_SPEED_IN_RPM = 1200; K_ADV = 0.0005(radian);
Y_60 HZ = 0.924465250, Sampling frequency = 4800 Hz Continuing from 106 of FIG. 7 the summed value (RHO) is used with the IRQ_CMD and IRD_CMD in the transformation represented at box 107 which corresponds to lines (5) and (6) of Table 7. After filtering (box 108), there is a 2-phase to 3-phase conversion (box 109) described at lines (7) and (8) of Table 7. This shows the IROTORA-REF and IROTORC-REF values. IROTORB-REF is determined as follows:

IROTORB-REF=-[IROTORA-REF]-[IROTORC-REF]

Figure 9:
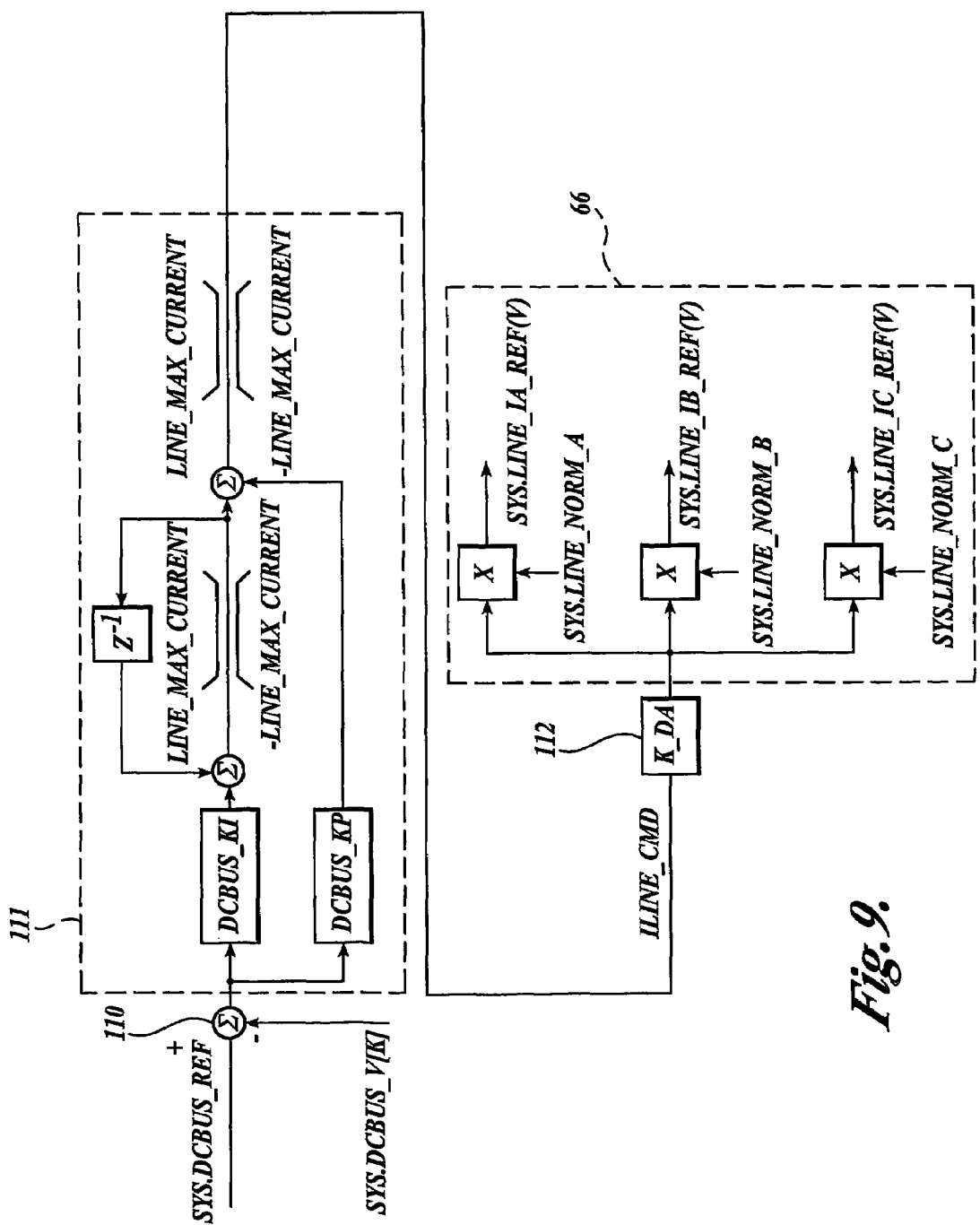
FIG. 9 is a diagram of a sixth aspect of the control system.

With reference to box 65 and box 66 of FIG. 3, the sensed DC voltage (link voltage between the line side and rotor side converters) is filtered on the analog side prior to A/D conversion. FIG. 9 and Table 9 show the algorithms for both DC voltage regulation (box 65) and determination of the line current references at 66 (ILINEA-REF, etc.). Greater detail is given in FIG. 9 and Table 9.

TABLE 9 sys.debus_ref = 1050 V; DCBUS_kp = 4.0(A/V); DCBUS_ki = 1200(A/V/SEC); update rate = 4800 Hz;
CAP_DCBUS = 8 * 8200/3 = 21867 (uF); LINE_MAX_CURRENT = sqrt(2) * 566.0 (A);
K_DA = 2 * BURDEN_RESISTOR/5000(V/A); BURDEN_RESISTOR of Line-side inverter = 30.1 ohms Starting at the left of FIG. 9, the nominal voltage of the DC bus between the rotor side and line side converters is compared at 110 with the actual sensed bus voltage. The result is processed by a digital proportional and integral control loop 111 to determine the ILINE_CMD signal. This provides the required magnitude of current from each phase to maintain the desired bus voltage. These values are scaled at 112 for digital to analog conversion. The scaled values are multiplied by the normalized voltages obtained as described above with reference to step 5 of Table 1. The results are the ILINE–REF values represented at 113 in FIG. 3.

Figure 10:
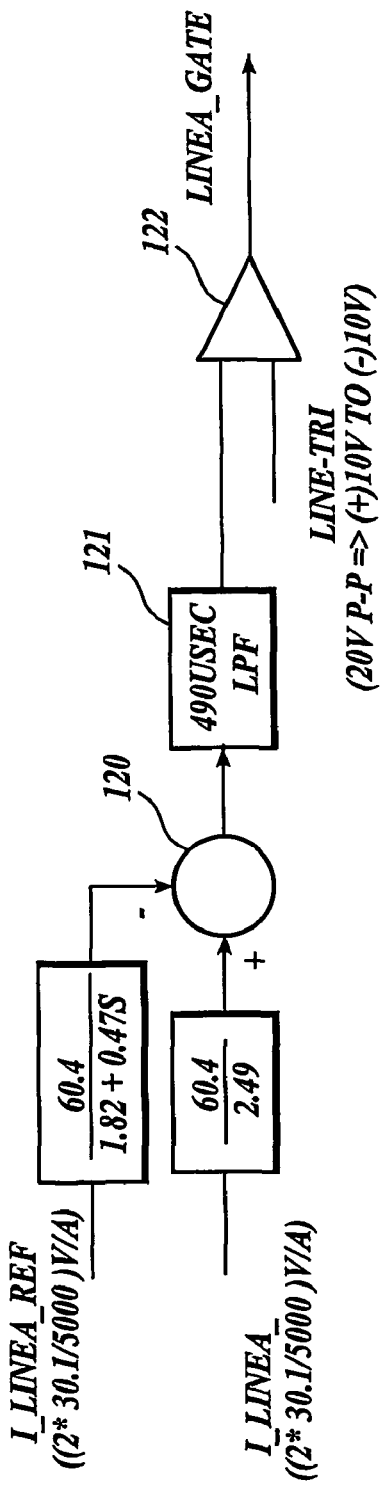
FIG. 10 is a diagram of a seventh aspect of the control system.
Figure 11:
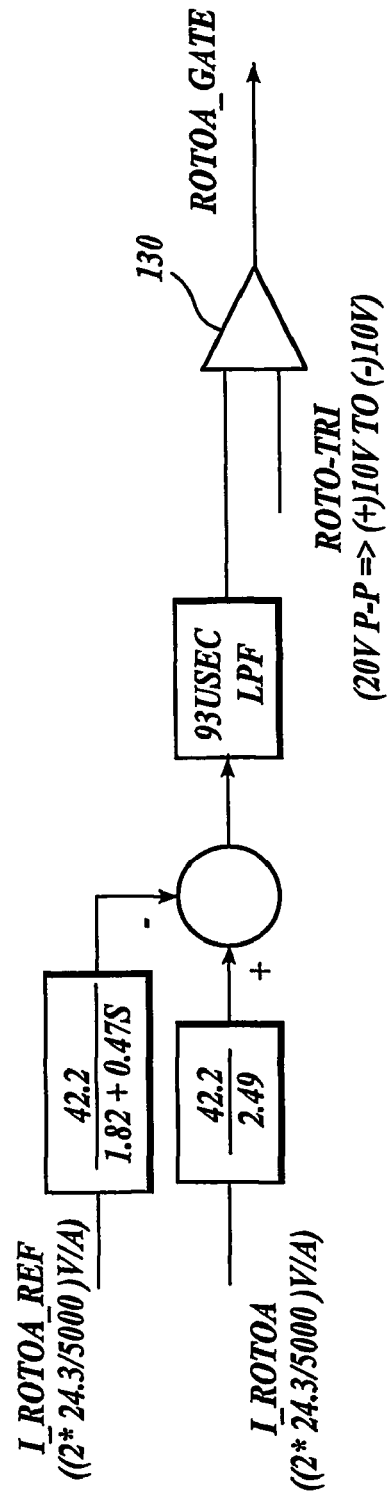
FIG. 11 is a diagram of an eighth aspect of the control system.

Concerning converter current regulators, the line converter is modulated with a 3.06 kHz carrier (LINE–TRI in FIG. 10) triangle wave that is used to set the duty cycle. The gating logic is determined by the transfer function shown in FIG. 10. I_LINDA_REF is determined as noted above with reference to FIG. 9, and I_LINEA is the actual sensed value. The comparison is made at 120, filtered at 121, and applied to comparator 122 to obtain the gating signal. For the rotor converter, FIG. 11, modulation is with a 2.04 kHz carrier (ROTO–TRI to 130 in FIG. 11) triangle wave that is used to set the duty cycle. I_ROTOA_REF is determined as given above with reference to FIG. 7, and I_ROTOA is the actual sensed value. FIGS. 10 and 11 show the transfer functions for one phase (A), but the same functions are used for each of the other two phases.

Figure 12:
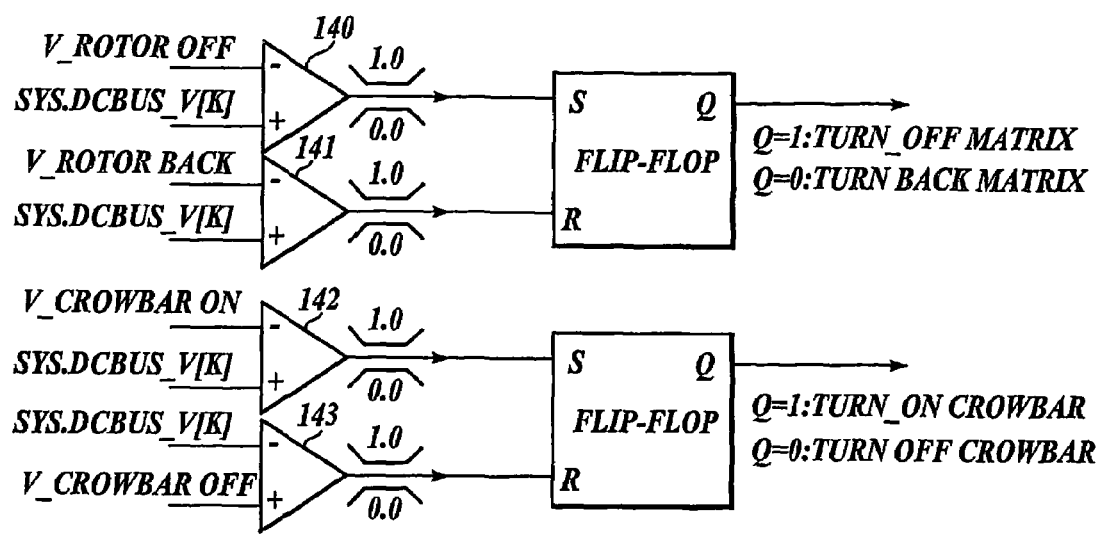
FIG. 12 is a diagram of a ninth aspect of the control system.

FIG. 12 illustrates the algorithm for control of the rotor side converter switching devices during a significant transient, and crowbar actuation for a possibly greater transient. In general, gating at the rotor side converter will be stopped when the link voltage, the $V_{DC}$ (also called SYS.DCBUS_V), rises above a predetermined limit, such as about 10% above nominal. If the DC link voltage reaches an even higher limit, such as about 20% above nominal, the crowbar is activated. Values for FIG. 12 are given in Table 12.

TABLE 12

V_CROWBAR_ON = 1250 V;
V_CROWBAR_OFF = 1055 V;
V_ROTOR_OFF = 1150 V;
V_ROTOR_BACK = 1055 V;
NORMAL_V_DCBUS = 1050 V

The operation of comparator 140 in FIG. 12 is to apply a "high" signal to turn off the rotor converter transistors when the sensed bus voltage (SYS.DCBUS V) is above a predetermined limit (1150 volts in the representative embodiment); and by comparator 141 to restart normal operation if system correction is sufficient to bring the DC bus voltage back to a predetermined lower level (V_ROTOR_BACK=1055V) in the representative embodiment. Similarly, comparator 142 controls activation of the crowbar if the DC bus voltage increases above a reference value (V_CROWBAR_ON=1250V) in the representative embodiment; and by comparator 143 to turn the crowbar off if the system corrects to a sufficiently low voltage (V_CROWBAR_OFF=1055V) in the representative embodiment.

Figure 13:
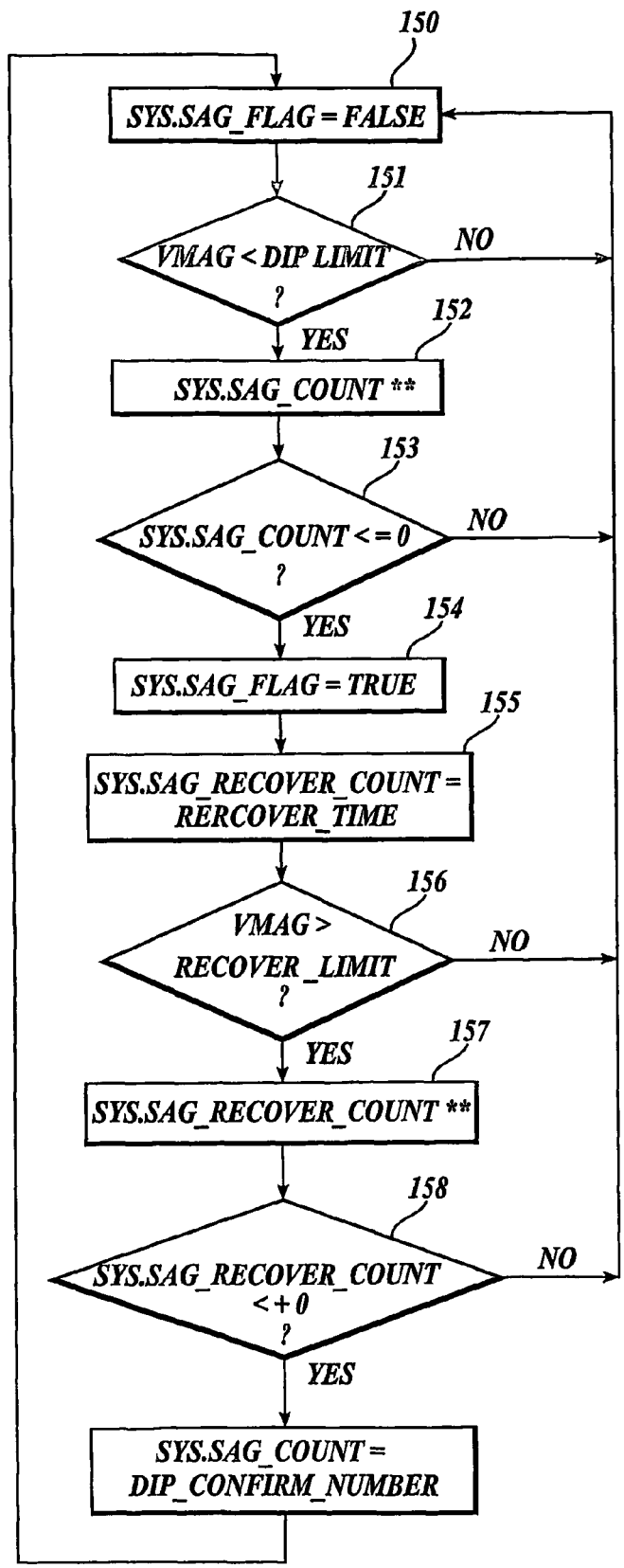
FIG. 13 is a flowchart of another aspect of the control system.

The different rotor and crowbar on and off voltages provide a desired amount of hysterisis. In addition, as represented in FIG. 13, the system logic can provide for predetermined delays before activating corrective measures. Table 13 applies to FIG. 13.

TABLE 13

DIP_LIMIT = 0.7 * 575 * sqrt(2) = 375 (V);
RECOVER_TIME = 40/4 = 10;

TABLE 13-continued

RECOVER_LIMIT = 500 (V);
DIP_CONFIRM_NUMBER = 3;
operated at a rate of 4800 Hz.

Starting at the top of FIG. 13, a "SYS.SAG" flag is set at "false" during normal operation, indicating that no significant under voltage event is occurring in the utility grid. At box 151, a decision is reached as to whether or not grid voltage has sagged below the predetermined limit, such as 70% of nominal. If not, no action is taken and the logic recycles to the initial box 150. If the measured value of the magnitude of the AC grid voltage is below the DIP_LIMIT value, a down counter 152 is triggered, and at box 153 an evaluation is made as to whether or not the counter has reached zero. In the representative embodiment, counter 152 starts at 3 and counts downward to 0 (i.e., three, then two, then one, then zero), provided that the VMAG value has continued to be below the reference value. The recycling frequency is 4800 Hz, so this would correspond to a voltage dip or sag in excess of 3 divided by 4,800 or $\frac{1}{1600}$ second.

At that point, the SYS.SAG flag is set at true (box 154) and the system evaluates whether or not the VMAG value has recovered for a predetermined number of cycles, similar to the procedure described above. In the case of recovery, the count starts at 10 and decreases for each cycle that the recovery limit has been met (boxes 155, 156, 157, 158), ultimately resulting in resetting the SYS.SAG flag to false if the recovery voltage has been exceeded for ten 4800 Hz decision cycles.

The logic for an over voltage event (grid surge) is somewhat different. With reference to FIG. 4, some moderate increase in rotor current is achieved when a high voltage is measured, but there is no "ramping" of the type described with reference to the SAG adjustment. However, the logic of FIG. 12 concerning monitoring of the DC bus voltage still applies. Thus, if the surge is sufficient to raise the DC link voltage, corrective measures are taken at the same voltages for an over voltage event as for an under voltage event, and recovery also is achieved at the same voltages.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of controlling a doubly fed induction generator (DFIG) system, such DFIG system having a generator with a stator energized by a grid having a voltage with a nominal value, a driven rotor coupled with the stator, a grid side converter electrically connected to the grid, a rotor side converter electrically connected to the rotor, a DC link connecting the converters, a controller supplying control signals to the converters for control of the torque and reactive power from the DFIG system, which method comprises:

providing rotor current command signals from the controller;

monitoring the voltage of the grid for transients from nominal; and if a transient greater than a first predetermined transient occurs, adjusting the rotor current command signals to permit continued operation of the DFIG system without disconnecting the DFIG from the grid.

2. The method defined in claim 1, including, if a grid transient greater than a second predetermined transient (different from the first predetermined transient) occurs, automatically reducing the rotor current to a minimum value.

3. The method defined in claim 2, in which the rotor side converter has switching transistors, and including turning off the switching transistors to reduce rotor current to a minimum level if a transient greater than the second predetermined transient occurs.

4. The method defined in claim 2 or claim 3, including, if a grid transient greater than a third predetermined transient (different from both of the first and second predetermined transients) occurs, activating a crowbar to reduce the voltage of the DC link.

5. The method defined in claim 1, including monitoring the voltage of the grid for a voltage sag from nominal, and if a voltage sag greater than a first predetermined sag occurs, adjusting the rotor current command signals to reduce rotor torque and reactive power, whereby the DFIG system rides through the transient.

6. The method defined in claim 1 or claim 5, in which the torque producing component of the rotor current is adjusted.

7. The method defined in claim 1 or claim 5, in which the flux producing component of the rotor current is adjusted.

8. The method defined in claim 1 or claim 5, in which both the torque producing and flux producing components of the rotor current are adjusted.

9. The method defined in claim 1 or claim 5, in which the rotor current is reduced progressively during the transient.

10. The method defined in claim 9 in which the rotor current is increased progressively following the transient.

11. The method defined in claim 1, including, if a grid transient greater than a second predetermined transient (different from the first predetermined transient) occurs, automatically activating a crowbar to reduce the voltage of the DC link.

12. The method defined in claim 11, including monitoring the voltage of the grid for transients greater than the second predetermined transient by monitoring the voltage of the DC link.

13. A method of controlling a doubly fed induction generator (DFIG) system, such DFIG system having a generator with a stator energized by a grid having a voltage with a nominal value, a driven rotor coupled with the stator, a grid side converter electrically connected to the grid, a rotor side converter electrically connected to the rotor, a DC link connecting the converters, a controller supplying control signals to the converters for control of the torque and reactive power from the DFIG system, which method comprises:

monitoring the voltage of the grid for transients from nominal; and if a grid transient greater than a predetermined transient occurs, activating a crowbar to reduce the voltage of the DC link connecting the converters, without disconnecting the DFIG system from the grid.

14. The method defined in claim 13, including monitoring the voltage of the grid for transients greater than the predetermined transient by monitoring the voltage of the DC link, and activating the crowbar if the DC link voltage increases above a predetermined voltage, without disconnecting the DFIG system from the grid.

15. A method of controlling a DFIG system, such DFIG system having a generator with a stator energized by an AC utility grid having a voltage with a nominal value, a variable speed wind driven rotor coupled with the stator, a grid side AC-DC converter electrically connected to the grid at the AC side, a rotor side AC-DC converter electrically connected to the rotor at the AC side, a DC link connecting the DC sides of the converters, a controller supplying control signals to the converters for controlling operation of switching transistors thereof, which method comprises:

calculating rotor current command signals to control the converter switching transistors to maintain a desired rotor current;

monitoring the voltage of the utility grid for transients from nominal; and if a grid transient greater than a first predetermined transient occurs, adjusting the rotor current command signals to reduce rotor current and thereby reduce rotor torque and reactive power to permit continued rotation of the rotor without disconnecting the DFIG system from the grid, whereby the DFIG system rides through the transient; and following the transient, returning the rotor current command signals to operate as before occurrence of the grid transient.

16. The method defined in claim 15, including reducing the rotor current progressively during the transient.

17. The method defined in claim 15 including, if a grid transient greater than the first predetermined transient occurs, automatically turning off the rotor side converter to reduce rotor current to minimum.

18. The method defined in claim 17 including, if a grid transient greater than a second predetermined transient (different from the first predetermined transient) occurs, automatically activating a crowbar to reduce the voltage of the DC link.

19. The method defined in claim 18, including monitoring the voltage of the utility grid for transients greater than the second predetermined transient by monitoring the voltage of the DC link.

20. A controller for a doubly fed induction generator (DFIG) system, such DFIG system having a generator with a stator energized by a grid having a voltage with a nominal value, a driven rotor coupled with the stator, a grid side converter electrically connected to the grid, a rotor side converter electrically connected to the rotor, a DC link connecting the converters, said controller comprising means for supplying control signals to the converters for control of the torque and reactive power from the DFIG system, said controller further comprising:

means for providing rotor current command signals from the controller;

means for monitoring the voltage of the grid for transients from nominal; and means for adjusting the rotor current command signals to permit continued operation of the DFIG system without disconnecting the DFIG system from the grid if a transient greater than a first predetermined transient occurs.

21. A controller for a doubly fed induction generator (DFIG) system, such DFIG system having a generator with stator energized by a grid having a voltage with a nominal value, a driven rotor coupled with the stator, a grid side converter electrically connected to the grid, a rotor side converter electrically connected to the rotor, a DC link connecting the converters, said controller comprising means for supplying control signals to the converters for control of the torque and reactive power from the DFIG system, said controller further comprising:

means for monitoring the voltage of the grid for transients from nominal; and means for activating a crowbar to reduce the voltage of the DC link connecting the converters if a grid transient greater than a predetermined transient occurs, without disconnecting the DFIG system from the grid.

22. A controller for a DFIG system, such DFIG system having a generator with a stator energized by an AC utility grid having a voltage with a nominal value, a variable speed wind driven rotor coupled with the stator, a grid side AC-DC converter electrically connected to the grid at the AC side, a rotor side AC-DC converter electrically connected to the rotor at the AC side, a DC link connecting the DC sides of the converters, said controller comprising means for supplying control signals to the converters for controlling operation of switching transistors thereof, said controller further comprising:
- means for calculating rotor current command signals to control the converter switching transistors to maintain a desired rotor current;
- means for monitoring the voltage of the utility grid for transients from nominal; and
- means for adjusting the rotor current command signals to reduce rotor current and thereby reduce rotor torque and reactive power to permit continued rotation of the rotor without disconnecting the DFIG system from the grid if a grid transient greater than a first predetermined transient occurs, whereby the DFIG system rides through the transient; and
- means for returning the rotor current command signals to operate as before occurrence of the grid transient following the transient.

23. A doubly fed induction generator (DFIG) system comprising:
- a generator with a stator energized by a grid having a voltage with a nominal value;
- a driven rotor coupled with the stator;
- a grid side converter electrically connected to the grid;
- a rotor side converter electrically connected to the rotor;
- a DC link connecting the converters; and
- a controller supplying control signals to the converters for control of the torque and reactive power from the DFIG system;
- means for providing rotor current command signals from the controller;
- means for monitoring the voltage of the grid for transients from nominal; and
- means for adjusting the rotor current command signals to permit continued operation of the DFIG system without disconnecting the DFIG system from the grid if a transient greater than a first predetermined transient occurs.

24. A doubly fed induction generator (DFIG) system comprising:
- a generator with a stator energized by a grid having a voltage with a nominal value;
- a driven rotor coupled with the stator;
- a grid side converter electrically connected to the grid;
- a rotor side converter electrically connected to the rotor;
- a DC link connecting the converters;
- a controller supplying control signals to the converters for control of the torque and reactive power from the DFIG system;
- means for monitoring the voltage of the grid for transients from nominal;
- a crowbar constructed and arranged to reduce the voltage of the DC link; and
- means for activating a crowbar to reduce the voltage of the DC link connecting the converters if a grid transient greater than a predetermined transient occurs.

25. A DFIG system comprising:
- a generator with a stator energized by an AC utility grid having a voltage with a nominal value;
- a variable speed wind driven rotor coupled with the stator;
- a grid side AC-DC converter electrically connected to the grid at the AC side;
- a rotor side AC-DC converter electrically connected to the rotor at the AC side;
- a DC link connecting the DC sides of the converters;
- a controller supplying control signals to the converters for controlling operation of switching transistors thereof;
- means for calculating rotor current command signals to control the converter switching transistors to maintain a desired rotor current;
- means for monitoring the voltage of the utility grid for transients from nominal; and
- means for adjusting the rotor current command signals to reduce rotor current and thereby reduce rotor torque and reactive power to permit continued rotation of the rotor without disconnecting the DFIG system from the grid if a grid transient greater than a first predetermined transient occurs, whereby the DFIG system rides through the transient; and
- means for returning the rotor current command signals to operate as before occurrence of the grid transient following the transient.

* * * * *